(12) United States Patent
Lunden et al.

(10) Patent No.: US 9,906,974 B2
(45) Date of Patent: Feb. 27, 2018

(54) CHANNEL QUALITY MEASUREMENT AND REPORTING IN A DUAL CONNECTIVITY SCENARIO

(71) Applicant: Nokia Technologies Oy, Espoo (FI)

(72) Inventors: Jari Petteri Lunden, Espoo (FI); Elena Virtej, Espoo (FI); Esa Mikael Malkamäki, Espoo (FI); Martti Johannes Moisio, Klaukkala (FI); Antti Sakari Sorri, Helsinki (FI)

(73) Assignee: Nokia Technologies OY, Espoo (FI)

( * ) Notice: Subject to any disclaimer, the term of this patent is extended or adjusted under 35 U.S.C. 154(b) by 64 days.

(21) Appl. No.: 14/912,429

(22) PCT Filed: Oct. 9, 2013

(86) PCT No.: PCT/IB2013/002238
§ 371 (c)(1),
(2) Date: Feb. 17, 2016

(87) PCT Pub. No.: WO2015/052545
PCT Pub. Date: Apr. 16, 2015

(65) Prior Publication Data
US 2016/0205577 A1    Jul. 14, 2016

(51) Int. Cl.
*H04W 24/10*   (2009.01)
*H04W 72/08*   (2009.01)
*H04W 72/04*   (2009.01)
*H04W 88/08*   (2009.01)
*H04L 1/00*    (2006.01)

(52) U.S. Cl.
CPC .......... *H04W 24/10* (2013.01); *H04L 1/0026* (2013.01); *H04W 72/0426* (2013.01); *H04W 72/085* (2013.01); *H04W 88/08* (2013.01)

(58) Field of Classification Search
CPC . H04W 24/10; H04W 88/08; H04W 72/0426; H04W 72/085; H04L 1/0026
See application file for complete search history.

(56) References Cited

U.S. PATENT DOCUMENTS

| | | | |
|---|---|---|---|
| 2011/0269442 A1* | 11/2011 | Han | H04W 72/082 455/418 |
| 2011/0317635 A1* | 12/2011 | Swaminathan | H04W 36/0088 370/329 |
| 2012/0115527 A1* | 5/2012 | Narasimha | H04W 24/10 455/513 |

OTHER PUBLICATIONS

International Search Report and Written Opinion received for corresponding Patent Cooperation Treaty Application No. PCT/IB2013/002238, dated Jul. 17, 2014, 20 pages.

(Continued)

*Primary Examiner* — Andrew Lai
*Assistant Examiner* — Harry H Kim
(74) *Attorney, Agent, or Firm* — Nokia Technologies OY

(57) ABSTRACT

Disclosed is a User Equipment UE, which establishes connection with a macro eNB (or master eNB) and a small cell eNB (or secondary eNB), measures channel quality (CQI) of a signal received from the small cell eNB, derives a second channel quality based on the measured channel quality of the signal received from the small cell eNB, transmits information associated with the measured channel quality of the signal to the small cell eNB and transmits information associated with the second channel quality to the macro eNB.

11 Claims, 6 Drawing Sheets

(56) References Cited

OTHER PUBLICATIONS

Intel Corporation: "3GPP TSG RAN WG2 Meeting #82; R2-131990; radio link failure handling for dual connectivity", 3GPP Draft; R2-131990, 3rd Generation Partnership Project (3GPP), Mobile Competence Centre; 650 Route Des Lucioles; F-06921 Sophia-Antipolis Cedex; France, vol. RAN WG2, No. Fukuoka, Japan; May 20, 2013-May 25, 2013 May 11, 2013, retrieved from the Internet: URL: //www.3gpp.org/ftp/tsg_ran/WG2_RL2/TSGR283bis/Docs/.

Gatt et al. "3GPP TSG RAN WG2 Meeting #83bis; R2-133363; RLM considerations for dual connectivity", 3GPP Draft; R2-133363 RLM Considerations for dual Connectivity, 3rd Generation Partnership Project (3GPP), Mobile Competence Centre; 650 Route Des Lucioles; F-06921 Sophia-Antipolis Cedex; France, vol. RAN WG2, No. Ljubljana, Slovenia Oct. 7, 2013-Oct. 11, 2013 Sep. 27, 2013, retrieved from the Internet: URL: //www.3gpp.org/ftp/tsg_ran/WG2_RL2/TSGR2 82/Docs/.

Intel Corporation: "3GPP TSG RAN WG2 Meeting #74; R2-132932; Solutions for FDD-TDD joint operation", 3GPP Draft; R1-132932, 3rd Generation Partnership Project (3GPP), Mobile Competence Centre; 650 Route Des Lucioles; F-06921 Sophia-Antipolis Cedex; France, vol. RAN WG2, No. Barcelona, Spain; Aug. 19, 2013-Aug. 23, 2013 Aug. 10, 2013, retrieved from the Internet: URL: //www.3gpp.org/ftp/tsg_ran/WG1_RL1/TSGR1_74/Docs/.

Lucent Technologies et al; "3GPP TSG RAN WG1 Meeting #31; R1-030342; Text proposal on CQ1 Enhancement for TR on HSDPA Enhancements", 3GPP Draft; R1-030342, 3rd Generation Partnership Project (3GPP), Mobile Competence Centre; 650 Route Des Lucioles; F-06921 Sophia-Antipolis Cedex; France, vol. RAN WG1, No. Tokyo; Feb. 21, 2003 Feb. 21, 2003.

Alcatel-Lucent et al. "3GPP TSG RAN WG2 Meeting #83; R2-132766; Some considerations on RLM and RLF supporting dual connectivity", 3GPP Draft; R2-132766, 3rd Generation Partnership Project (3GPP), Mobile Competence Centre; 650 Route Des Lucioles; F-06921 Sophia-Antipolis Cedex; France, vol. RAN WG1, Barcelona, Spain Aug. 19, 2013-Aug. 23, 2013 Aug. 10, 2013, retrieved from the Internet: URL: //www.3gpp.org/ftp/tsg_ran/WG1_RL2/TSGR2_83/Docs/.

Pantech: "3GPP TSG RAN WG2 Meeting #81bis; R2-131100; Analysis of the RLF in dual connectivity", 3GPP Draft; R2-131100; Analysis of the RLF in dual connectivity, 3GPP Draft; R2-131100, 3rd Generation Partnership Project (3GPP), Mobile Competence Centre; 650 Route Des Lucioles; F-06921 Sophia-Antipolis Cedex; France, vol. RAN NG2, No. Chicago, USA Apr. 15, 2013-Apr. 19, 2013 Apr. 6, 2013 Retrieved from the Interent: URL: //www.3gpp.org/ftp/tsg_ran/WG2_RL2/TSGR2 81bis/Docs/.

\* cited by examiner

CHANNEL QUALITY MEASUREMENT AND REPORTING IN A DUAL CONNECTIVITY SCENARIO

RELATED APPLICATION

This application was originally filed as PCT Application No. PCT/IB2013/002238 filed Oct. 9, 2013.

TECHNICAL FIELD

The present application relates to wireless communications and, in particular, channel quality measurement and reporting for a user equipment (UE) with dual connection with small cell and macro cell.

BACKGROUND

The expected increase in wireless data transmissions may mean that there will be a need to deploy more network capacity. One efficient way to increase the network capacity is by deploying small cells for offloading purposes or offloading cells in general. These small cells can be deployed on the same or separate carriers relative to the serving cell, and the mixed environment with macro/large cells and small cells are often referred to heterogeneous networks (hetnets). Use of hetnets may provide opportunities for offloading traffic from the macro cells to, for example, a higher data rate or a higher capacity small cell.

The heterogeneous network may include one or more wireless access points, or base stations, such as for example an E-UTRAN (evolved Universal Mobile Telecommunications System Terrestrial Radio Access Network) NodeB base station serving macro cells, and one or more small cell base stations serving small cells. For example, a small cell base station (or a wireless access point or a remote radio head, for example) may be implemented to cover a small cell, or coverage area, examples of which include a residence, a small business, a building, an office, or a small area. The small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less/smaller coverage/range and lower power capabilities given its limited coverage area or class. Furthermore, small cell base station may have limited (or non-ideal) backhaul connection that may have higher latency or lower throughput than macro cell base stations. This limited backhaul connection may affect communication between small cell base station and other base stations and other network elements or nodes. A user equipment may act as an access point or a base station for other devices (multiple devices, or part of device to device communication or group communication), so that in some cases also a user equipment could be considered also a limited capability base station or small cell. For example, the small cell base station may be implemented as a femtocell wireless access point/base station having power sufficient for a cell serving wireless devices within a limited range of about tens of meters. Picocell base stations are another example of a small cell base station, but picocell base stations have somewhat greater range serving a small area on the order of about 100-200 meters. The small cell base station may be implemented as a secondary base station, for example, a secondary cell (SCell) eNB in carrier aggregation. It may also be called a secondary eNB (SeNB). Accordingly, wireless service providers view small cell base stations as a way to extend service coverage into a small cell, as a way to offload traffic to the small cell base stations, and/or as a way to provide enhanced service, such as for example higher data rates, lower latencies, energy efficiency and the like, within the small cell, when compared to the larger macro cell served by a typical base station, such as for example the eNB base station. The macro cell base station may be also implemented as a primary base station, for example, a primary cell (PCell) eNB in carrier aggregation and may also be called master eNB (MeNB).

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: establish connection with a first cell and a second cell; measure channel quality of a signal received from the second cell; derive a second channel quality based on the measured channel quality of the signal received from the second cell; transmit information associated with the measured channel quality of the signal to the second cell; and transmit information associated with the second channel quality to the first cell.

According to a second aspect of the present invention, a method comprising: establishing connection with a first cell and a second cell; measuring channel quality of a signal received from the second cell; deriving a second channel quality based on the measured channel quality of the signal received from the second cell; transmitting information associated with the measured channel quality of the signal to the second cell; and transmitting information associated with the second channel quality to the first cell.

According to a third aspect of the present invention, a computer program product comprising a non-transitory computer-readable medium bearing computer program code embodied therein for use with a computer, the computer program code comprising code for: establishing connection with a first cell and a second cell; measuring channel quality of a signal received from the second cell; deriving a second channel quality based on the measured channel quality of the signal received from the second cell; transmitting information associated with the measured channel quality of the signal to the second cell; and transmitting information associated with the second channel quality to the first cell.

According to a fourth aspect of the present invention, an apparatus comprising: at least one processor; and at least one memory including computer program code, wherein the at least one memory and the computer program code are configured to, with the at least one processor, cause the apparatus to perform at least the following: establish connection with a user equipment, wherein the user equipment has connection with a second base station and the connection with the apparatus and the second base station is configured in a time division multiplexing pattern; and receive information associated a channel quality from the user equipment or the second base station, wherein the information associated the channel quality representative of channel quality between the user equipment and the second base station.

According to a fifth aspect of the present invention, an apparatus comprising: means for establishing connection with a first cell and a second cell; means for measuring channel quality of a signal received from the second cell; means for deriving a second channel quality based on the measured channel quality of the signal received from the second cell; means for transmitting information associated with the measured channel quality of the signal to the second cell; and means for transmitting information associated with the second channel quality to the first cell.

According to a sixth aspect of the present invention, an apparatus comprising: means for establishing connection with a user equipment, wherein the user equipment has connection with a second base station and the connection with the apparatus and the second base station is configured in a time division multiplexing pattern; and means for receiving information associated a channel quality from the user equipment or the second base station, wherein the information associated the channel quality representative of channel quality between the user equipment and the second base station.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Dual connectivity refers to the scenario that a UE is connected simultaneously to two different base stations, for example, one macro cell base station and one small cell base station. This may be achieved for example with dual radio or single radio. In an example embodiment, UE has dual radio and it has the possibility of receiving and transmitting simultaneously to or from macro and small cell, achieving dual connectivity is relatively straightforward. In another example embodiment, UE communicates with one of the macro and small cell at a time, for example, when UE has single radio frequency (RF) chain or when UE does not support the band combination necessary to simultaneously transmit to or receive from macro and small cell base stations, UE may use a time division multiplexing (TDM) type of solution to achieve dual connectivity. UE may be logically connected simultaneously to two cells, but physically receiving or transmitting from/to only one of the cells at the time. In the TDM type of solution, UE may listen to macro and small cell according to a known TDM pattern. For example, UE communicates 500 ms with the small cell, then 20 ms with macro cell and then again 500 ms with small cell and so on. As another example, UE may use a pattern similar to measurement gap patterns specified in LTE-A standard, for example, 5-6 ms every 80 ms in macro cell and otherwise in the small cell. Reference can be made to 3GPP TS 36.133 V12.1.0 (2013-09) 3rd Generation Partnership Project; Technical Specification Group Radio Access Network; Evolved Universal Terrestrial Radio Access (E-UTRA); Requirement for support of radio resource management (Release 12). Other TDM patterns with different time periods may be used as well. One alternative is that the TDM pattern is semi-statically configured to the UE for instance by using RRC signaling. When the small cell connection fails while the UE is still being served by the small cell, it may be necessary and/or beneficial for the UE to detect connection loss quickly and resume connection with macro cell without waiting for next opportunity for macro cell communication according to the known TDM pattern.

The subject matter disclosed herein provides a way for UE with dual connectivity to macro and small cell to detect connection loss of the small cell and recover from the connection loss by resuming connection to the macro cell. Specifically, there is provided a way of detecting connection loss of the small cell with UE reporting small cell channel quality to both macro cell and small cell—thus allowing the macro cell to know the small cell channel quality and therefore resuming connection with the UE when the connection loss of the small cell is detected, for example, when small cell channel quality is below a certain threshold.

Figure 1:
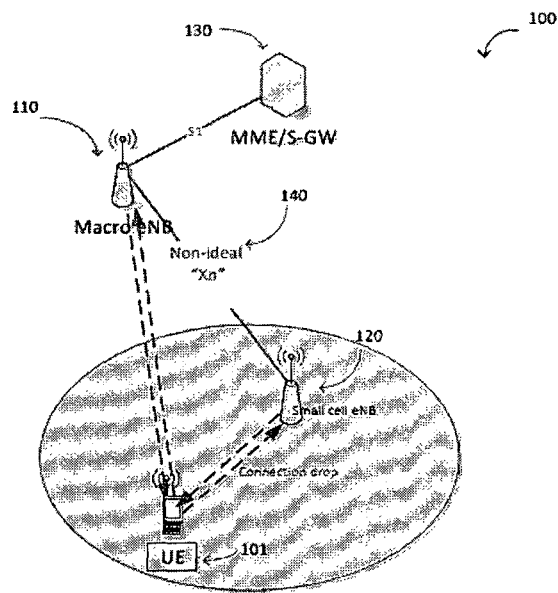
FIG. 1 depicts an example of a heterogeneous network in which some embodiments of the present invention may be practiced.

FIG. 1 illustrates an example heterogeneous network 100 in which some example embodiments of the present invention may be practiced. As illustrated in FIG. 1, in the heterogeneous network 100, a UE 101 is in connection with a macro eNB 110 and a small cell eNB 120. The UE 101 may be in a dual connectivity mode, that is, UE is connected simultaneously to both macro eNB 110 and small cell eNB 120. The coverage area of the small cell eNB 120 is depicted by the ellipse, wherein the coverage area of the macro cell eNB 110 is much larger than that of the small cell eNB and may overlay the coverage area of the small cell eNB. Within the same coverage area of the macro cell eNB 110, UE's movement among small cells may lead to handover, cell change, small cell removal and addition, or reselection among small cells. The macro cell eNB may be in connection with the small cell eNB via an open interface 140, for example X2, Xn interface, or the like. This interface may be non-ideal, for example, having latency above 1 ms and even up to 60 ms or more, which may introduce significant delay in communication between macro cell eNB and small cell eNB. The macro cell eNB may be in connection with core network, for example, mobility management entity (MME) and serving gateway (S-GW) 130, via S1 interface. In some example embodiments, the small cell eNB may be in connection with core network via macro cell eNB. In some other example embodiments the small cell eNB may be directly in connection with core network.

Although FIG. 1 depicts a certain quantity of user equipment, base stations, and cells including small cell and macro cell, other quantities and configurations may be used as well. Additional connections or interfaces may also be present, for example, between small cell base station and the core network. It is noted that the term of macro cell and small cell has been and will be hereinafter described for purposes of example, the same cell type may be used according to the present invention. For example, one cell may be a master cell served by MeNB and the other cell may be an assisting cell served by SeNB.

Figure 2:
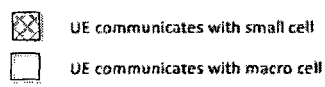
FIG. 2 illustrated an example of time division multiplexing pattern for macro cell and small cell communication in accordance with some embodiments of the invention.
Figure 2:
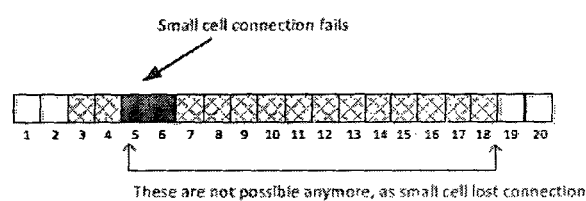

FIG. 2 illustrates an example of TDM pattern for macro cell and small cell communication in accordance with some example embodiments of the invention. As illustrated in FIG. 2, according to the TDM pattern UE communicates the first two time slots (e.g. subframes) with macro cell, then 16 time slots from slot 3 to slot 18 with small cell and then again two time slots from slot 19 to slot 20 with macro cell. Any other pattern is also possible. This pattern may be periodic and configured by the network. The connection with small cell may fail while UE is still being served by the small cell, for example, in FIG. 2 the connection with small cell fails at time slot 5. When the connection with small cell fails, the rest of time slots configured for small cell communication, for example, slots 6-18 in FIG. 2, may not be possible or usable anymore. And according to the configured TDM pattern, the next opportunity for connection with macro cell is time slot 19. Therefore it may be necessary for UE to detect the connection loss quickly and resume connection with macro cell without waiting for next opportunity for macro cell communication according to the configured TDM pattern. This may avoid unnecessary delay due to UE waiting for the next opportunity according to the TDM pattern before attempting to communicate with the macro cell base station. The TDM pattern of this example should not be seen as restrictive, other patterns may be used as well.

Figure 3:
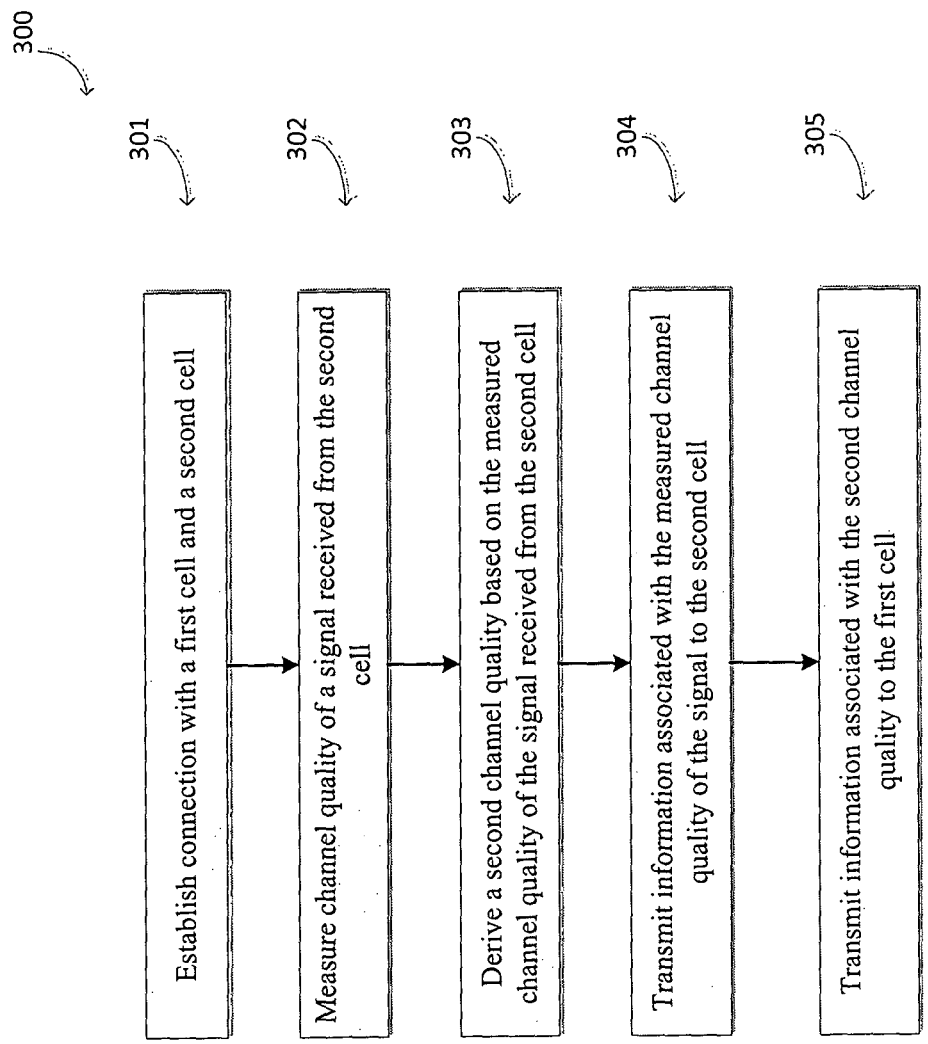
FIG. 3 depicts an example process for detection of small cell connection loss in a heterogeneous network in accordance with some embodiments of the invention.

FIG. 3 depicts an example process for detection of small cell connection loss in a heterogeneous network in accordance with some embodiments of the invention. Example process 300 may be performed by or in an apparatus, such as the user equipment 101 of FIG. 1.

At 301, the apparatus establishes connection with a macro cell (or master eNB) and a small cell eNB (or secondary eNB). In an example embodiment, the connection with the macro cell and the small cell is configured in a TDM pattern, for example, the TDM pattern as illustrated in FIG. 2.

At 302, the apparatus measures channel quality of a signal received from a small cell eNB. In an example embodiment, the signal received from a small cell eNB is a pilot signal or reference signal. The apparatus measures channel quality of the pilot signal or reference signal, for example, signal to noise or interference ratio of the pilot signal or reference signal.

At 303, the apparatus derives a second channel quality based on the measured channel quality of the signal received from the small cell. The second channel quality may indicate whether the small cell link is still good enough to maintain the dual connection or UE should be served by just the macro cell. Therefore the second channel quality indication may be longer term channel quality rather than instantaneous channel quality, for example, the apparatus may derive the second channel quality by storing the measured channel quality values and averaging over a certain period. The period, for example, may start after sending a previous report. The period may be longer for example because the second channel quality of a small cell is not going to be used by the macro cell for immediate scheduling decisions, as this would not be practical due to delay of non-ideal backhaul, but for longer term decisions such as flow control, load balancing or small cell activation/deactivation/change or small cell removal.

At 304, the apparatus transmits information associated with the measured channel quality of the signal to the small cell. In an example embodiment, the information associated with the measured channel quality of the signal is a channel quality indication (CQI) of the small cell. Reference can be made to 3GPP TS 36.213 V11.2.0 (2013-02) 3rd Generation Partnership Project; Technical Specification Group Radio Access Network; Evolved Universal Terrestrial Radio Access (E-UTRA); Physical layer procedures (Release 11). Table 1 is an example of CQI table from the reference. In an example embodiment, the information associated with the measured channel quality of the signal received from small cell is transmitted to the small cell via a physical uplink control channel (PUCCH) and/or a physical uplink shared channel (PUSCH). For example, in the reference made above, the information associated with the measured channel quality is transmitted to the small cell using the same format as the CQI carried on PUCCH and/or PUSCH.

TABLE 1

An example of CQI table

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

At 305, the apparatus transmits information associated with the second channel quality to the macro cell. In an example embodiment, the information associated with the second channel quality is an indication of the second channel quality value, for example, a CQI in Table 1. In another example embodiment, the information associated with the second quality is an indication whether the second channel quality is below or above a configured threshold. In a further example embodiment, the information associated with the second quality is a relative value of the second channel quality to a channel quality measured from a signal received from the macro cell. For example, the information associated with the second quality is a ratio of the second channel quality to a channel quality measured from a signal received from the macro cell, or the ratio plus an offset.

In some example embodiments, the second channel quality may be the same as the measured channel quality. The second channel quality may be transmitted to the macro cell less frequently than to the small cell. Alternatively, the second channel quality may be transmitted to the macro cell based on an event, for example, the second channel quality changing, the second channel quality changing substantially, the second channel quality below or above a threshold, the second channel quality an offset below or above the channel quality of the macro cell plus an offset. The threshold and the offset may be configured by the network.

In some other example embodiments, the second channel quality indication may be an average CQI over a longer time window, not instantaneous CQI. For example, the second channel quality indication may be an average after the previous report, or average over a predetermined or configured time period such as 80 ms, 200 ms, or one or more multiples of the TDM period.

The second channel quality may not need to be sub-band specific and the resolution may be less than the CQI report specified in LTE standard. Reference can be again made to 3GPP TS 36.213 V11.2.0 (2013-02) 3rd Generation Partnership Project; Technical Specification Group Radio Access Network; Evolved Universal Terrestrial Radio Access (E-UTRA); Physical layer procedures (Release 11).

The apparatus also measures channel quality of macro cell and reports the measurement results to the macro cell. For example, the apparatus measures and reports macro cell CQI to the macro cell. In an example embodiment, the information associated with the second channel quality of small cell is transmitted to macro cell together with the CQI of the macro cell. In another example embodiment, the information associated with the second channel quality of small cell and the CQI of the macro cell are transmitted in a time division multiplexing pattern. For example, one report is for macro cell and the next report is for small cell. Due to possible errors in physical layer signaling, the apparatus may repeat the second channel quality of the small cell a few times in macro cell.

In an example embodiment, the apparatus transmits information associated with the second channel quality to the macro cell immediately after switching from the small cell to the macro cell. In another example embodiment, the apparatus transmits information associated with the second channel quality to the macro cell when the second channel quality has changed substantially since last report, for example, when the second channel quality is below or above a configured threshold or is "out of range".

In an example embodiment, resources for transmitting information associated with the second channel quality may be reserved when small cell is configured. For example, the format specified for carrier aggregation (CA) in LTE-A Release 10 may be used since in Release 10 all CQI reports including primary cell (PCell) and secondary cells (SCell) are sent to the PCell. Reference can be made to 3GPP TS 36.213 V10.a.0 (2013-06) 3rd Generation Partnership Project; Technical Specification Group Radio Access Network; Evolved Universal Terrestrial Radio Access (E-UTRA); Physical layer procedures (Release 10). In another example embodiment, a new format may be specified. For example, if the information associated with the second channel quality is an indication whether the small cell quality is below or above a threshold, 1 bit may be used for such indication. The information associated with the second channel quality may be transmitted to the macro cell via a physical uplink control channel (PUCCH) and/or a physical uplink shared channel (PUSCH).

When the same format as specified for carrier aggregation (CA) is used, then small cell CQI may be sent (repeated) every time CQI is reported in macro cell. Small cell and macro cell CQIs may also be reported to macro cell in TDM fashion, e.g., every other report is for macro cell and small cell (the small cell CQI may be, for example, an averaged one).

Figure 4:
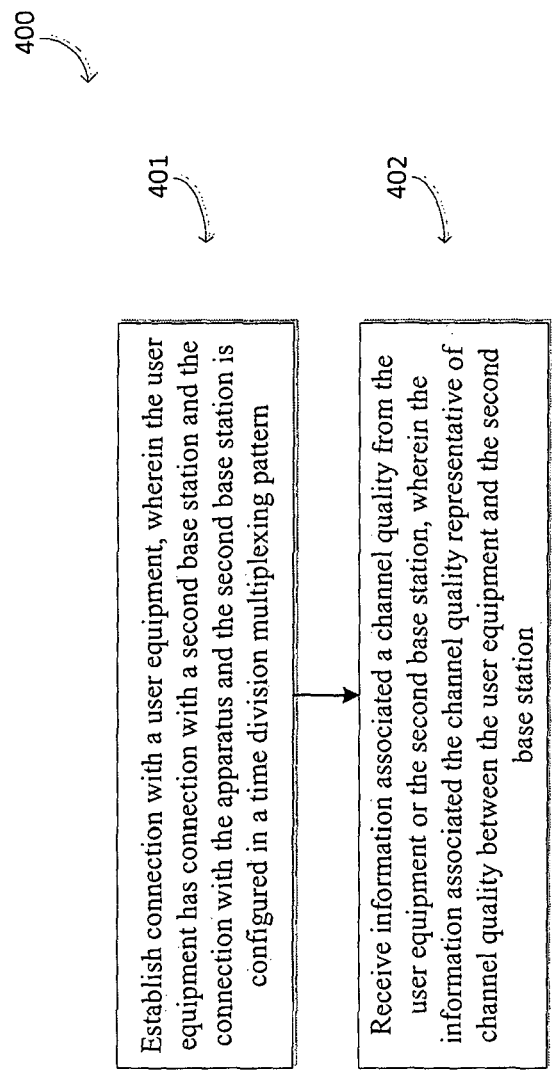
FIG. 4 depicts another example process for detection of small cell connection loss in a heterogeneous network in accordance with some embodiments of the invention.

FIG. 4 depicts another example process for detection of small cell connection loss in a heterogeneous network in accordance with some embodiments of the invention. Example process 400 may be performed by or in an apparatus, such as the macro cell eNB 110 of FIG. 1.

At 401, the apparatus establishes connection with a user equipment, wherein the user equipment has connection with a small cell eNB and the connection with the apparatus and the small cell eNB is configured in a TDM pattern. For example, the TDM pattern as illustrated in FIG. 2. The connection between UE and small cell eNB may be established or activated at the same time or at later time than the connection between the apparatus and the user equipment.

At 402, the apparatus receives information associated a channel quality from the user equipment or the small cell eNB. In an example embodiment, the apparatus receives information associated with a channel quality from the user equipment. The information associated with the channel quality refers to the information associated with the second channel quality described for FIG. 3. The information is received using the example embodiments provided for FIG. 3. In another example embodiment, the apparatus receives information associated with a channel quality from the small cell eNB, via interface 140, for example, Xn interface. The information associated with the channel quality may be CQI report received by the small cell eNB or averaged channel quality or CQI over a certain period. The information associated with the channel quality may also be a missing CQI report which may indicate a lost connection between UE and the small cell. The information associated with the channel quality may also be an indication whether the channel quality is above (or below) a threshold, where the threshold may have been signaled or configured by the apparatus. Receiving information associated with a channel quality from the small cell may be useful when the pattern period for small cell is long and/or Xn interface is fast and has free capacity. It may be also useful if the expected small cell CQI report from the UE is not received by the macro cell. Macro cell can use this information in TDM pattern configuration and/or also possibly if the small cell CQI report was received in macro cell (in case of dual connection) pass it to small cell via Xn interface, or signal an indication that the UE's small cell CQI is below a threshold.

The apparatus may reconfigure or deactivate the TDM pattern for the user equipment if the received information associated with the channel quality does not meet configured criteria. In an example embodiment, the apparatus reconfigures the TDM pattern when the received CQI of small cell is below a threshold. In another example embodiment, the apparatus reconfigures the TDM pattern when small cell reports one or more missing CQI from the UE which may indicate a lost connection between UE and the small cell. The apparatus may reconfigure the TDM pattern by configuring longer period for macro cell connection, or the apparatus may not configure time slots for small cell connection until the apparatus receives further indication that the small cell connection is improved. The apparatus may deactivate the TDM pattern. The apparatus may deactivate UE's connection with the small cell and/or small cell's connection with the UE. The apparatus may stop sending user data to the small cell, or reduce the amount user data forwarded to the small cell to be transmitted to the user by the small cell eNB. The apparatus may initiate bearer switching from small cell to the apparatus. The apparatus and the small cell eNB may have signaling via backhaul, for example, the interface 140 in FIG. 1, to indicate to the small cell eNB that the user has gone outside the coverage area of the small cell, or that the connection between small cell eNB and the user equipment has failed, or that user equipment is no longer attached to the small cell eNB and is now served by the apparatus. The apparatus may further configure one or more bearers with the user equipment if bearer switching is needed. The apparatus may start serving the user equipment, for example, by assigning dedicated radio resources through e.g. physical downlink control channel (PDCCH).

The macro cell and small cells may exchange load information via interface 140, for example, Xn interface. The apparatus may further perform load balancing between the macro cell and one or more small cells based on the received information from the UE or the small cell eNB and the load information from the small cells. For example, for a heavily loaded small cell, the eNB may reallocate UE with poor CQI to a lightly loaded small cell if the UE is within the coverage area of the small cell.

Figure 5:
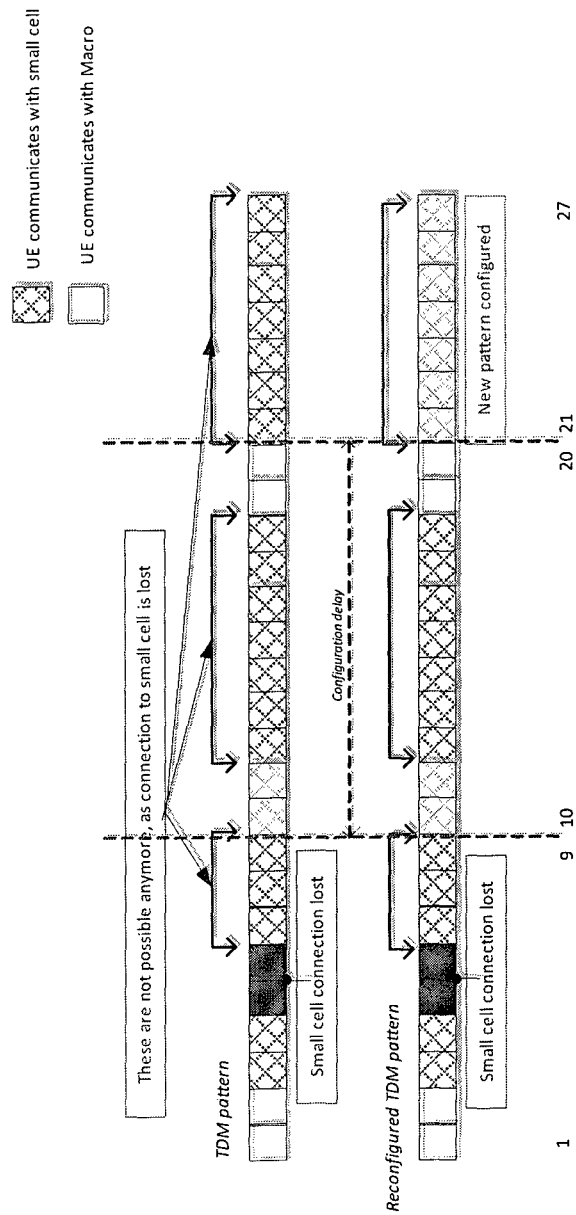
FIG. 5 depicts an example of time division multiplexing pattern reconfiguration for macro cell and small cell communication in accordance with some embodiments of the invention.

FIG. 5 depicts an example of time division multiplexing pattern reconfiguration for macro cell and small cell communication in accordance with some embodiments of the invention.

The upper part of FIG. 5 illustrates the TDM pattern with no reconfiguration and the bottom part shows the TDM pattern with reconfiguration. As illustrated in FIG. 5, a UE communicates the first two time slots (e.g. subframes) with macro cell, then seven time slots from slot 3 to slot 9 with small cell and then again two time slots from slot 10 to slot 11 with macro cell. It is noted that the TDM pattern of this example should not be seen as restrictive, other patterns may be used as well. At time slot 10, macro cell eNB may receive indication from the UE that the information associated the channel quality does not meet configured criteria, for example, the received CQI of small cell is below a threshold. The macro cell eNB may also receive information associated the channel quality from small cell eNB via interface 140, for example, Xn interface, without waiting until time slot 10. It may take one full cycle, for example, nine slots as shown in FIG. 5, until the macro cell reconfigure the TDM pattern. The macro cell eNB may reconfigure the TDM pattern by not assigning time slot for small cell, for example, the UE is served by the macro cell only. As shown in FIG. 5, at time slot 21, UE is served by macro cell instead of small cell. It is also possible that when macro cell is reconfiguring TDM pattern, the CQI report of small cell is improved and the TDM pattern may be reconfigured later.

When relaying small cell CQI directly to macro cell over Xn, macro cell eNB may detect lost small cell link based on the expected CQI not arriving to the macro cell eNB.

Figure 6:
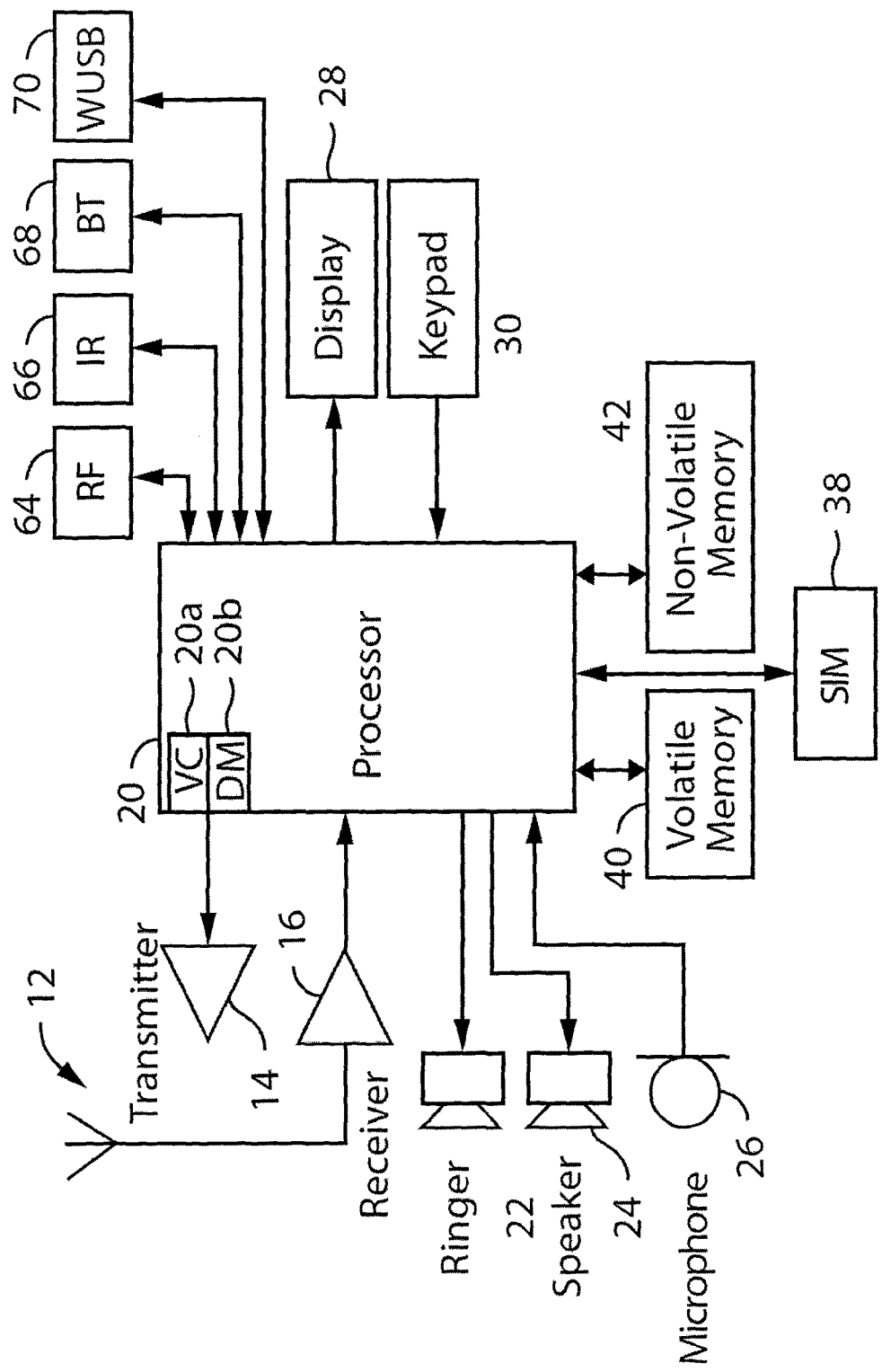
FIG. 6 illustrates a block diagram of a user equipment in accordance with some embodiments of the invention.

FIG. 6 illustrates a block diagram of an apparatus 10, which can be configured as user equipment, such as 101 of FIG. 1, in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 6 as a single processor, in some embodiments the processor 20 comprises a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor may additionally comprise an internal voice coder, VC, 20*a*, an internal data modem, DM, 20*b*, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus 10 may comprise a battery for powering various circuits related to the apparatus, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 6, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6 LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise a non-transitory memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment. The memories may comprise an identifier, such as for example, an international mobile equipment identification (IMEI) code, capable of uniquely identifying apparatus 10.

Figure 7:
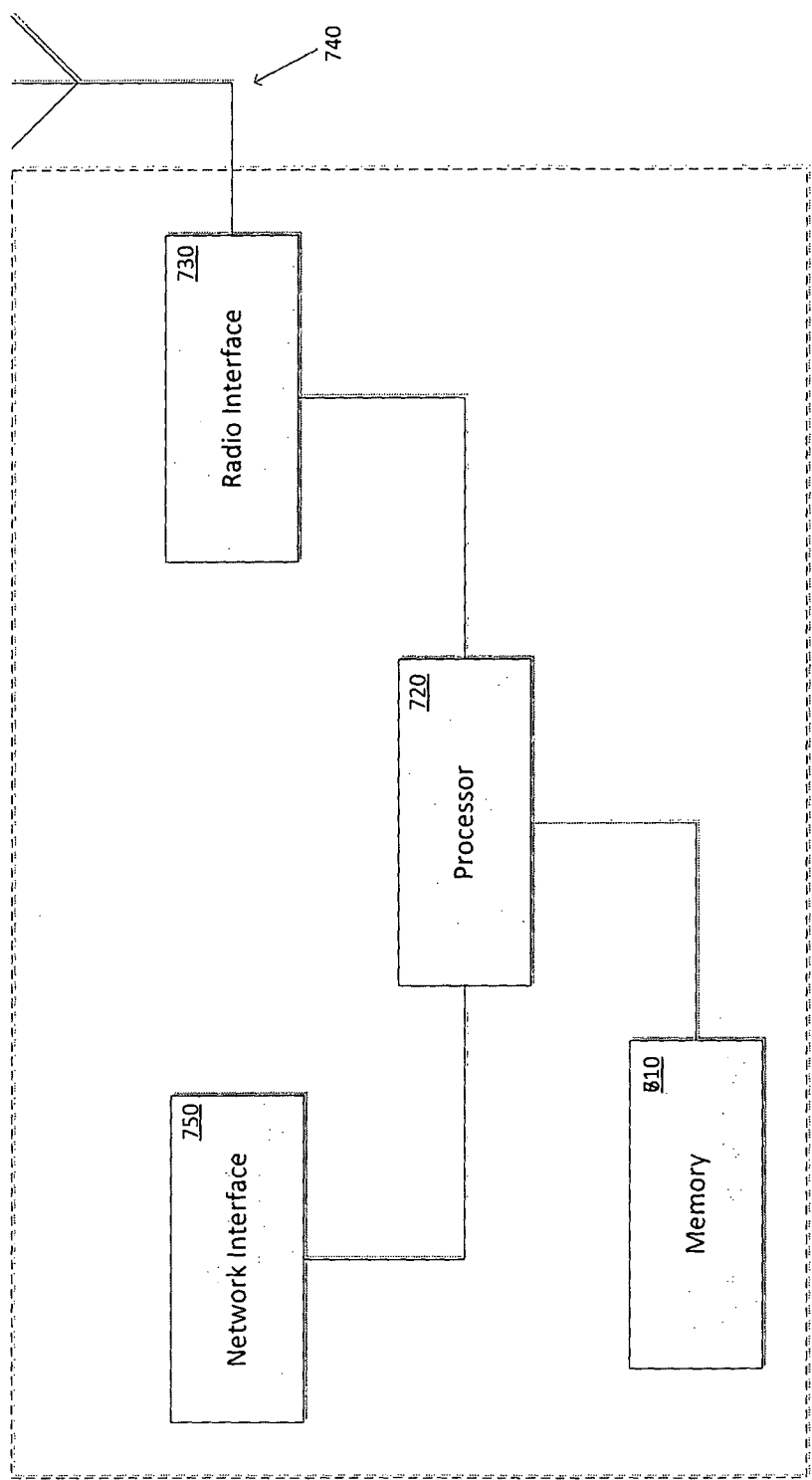
FIG. 7 illustrates a block diagram of a base station in accordance with some embodiments of the invention.

FIG. 7 depicts an example implementation of a base station in accordance with some embodiments of the invention, such as the macro cell base station eNB 110. The base station may include one or more antennas 740 configured to transmit via a downlink and configured to receive uplinks via the antenna(s). The base station may further include a plurality of radio interfaces 730 coupled to the antenna 740. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 730 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The base station may further include one or more network interfaces 750, such as interface 140 in FIG. 1, for receiving and transmitting to other base stations. The base station may further include one or more processors, such as processor 720, for controlling the interfaces 730 and 750 and for accessing and executing program code stored in memory 710. In some example embodiments, the memory 710 includes code, which when executed by at least one processor causes one or more of the operations described herein with respect to a base station.

Without in any way limiting the scope, interpretation, or application of the claims appearing below, a technical effect of one or more of the example embodiments disclosed herein may include detection and recovery from loss of small cell connection for a user equipment with dual connection with small cell and macro cell. It should be noted that the loss of small cell connection in this invention may mean that the signal quality goes below some threshold, for example, some communication may still be possible after that but e.g., the data rates may be too low.

Embodiments of the present invention may be implemented in software, hardware, application logic or a combination of software, hardware and application logic. The software, application logic and/or hardware may reside on a non-transitory memory 40 and/or 42, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable non-transitory storage medium that may be any media or means that can contain or store the instructions for use by or in connection with an instruction execution system, apparatus, or device, such as a computer. The scope of the present invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Other embodiments may be within the scope of the following claims. The term "based on" includes "based at least in part on".

What is claimed is:

1. A method comprising: establishing, by a user equipment, connection with a first cell and a second cell; measuring, by the user equipment, channel quality of a signal received from the second cell; deriving, by the user equipment, a second channel quality based on the measured channel quality of the signal received from the second cell; transmitting information associated with the measured channel quality of the signal to the second cell; and transmitting information associated with the second channel quality to the first cell, wherein the connection with the first cell and the second cell is configured in a time division multiplexing pattern; wherein deriving the second channel quality based on the measured channel quality of the signal comprises storing and averaging the measured channel quality of the signal over a period; and wherein transmitting information associated with the second channel quality to the first cell comprises at least one of: transmitting information associated with the second channel quality to the first cell after switching from the second cell to the first cell, and transmitting information associated with the second channel quality to the first cell when the second channel quality is below or above a configured threshold.

2. The method of claim 1, wherein the first cell is a macro cell or served by a master base station and the second cell is a small cell or served by a secondary base station.

3. The method of claim 1, wherein the information associated with the second channel quality comprises at least one of: channel quality indication associated with the second channel quality, whether the second channel quality is below or above a configured threshold, and relative value of the second channel quality to a channel quality measured from a signal received from the first cell.

4. The method of claim 1, wherein the information associated with the second channel quality is transmitted together with information associated with a measured channel quality of a signal from the first cell or is transmitted with the measured channel quality of the signal from the first cell in a time division multiplexing pattern.

5. An apparatus, comprising: at least one processor; and at least one memory including computer program code, wherein the at least one memory and the computer program code are configured to, with the at least one processor, cause the apparatus to perform at least the following: establish connection with a first cell and a second cell; measure channel quality of a signal received from the second cell; derive a second channel quality based on the measured channel quality of the signal received from the second cell; transmit information associated with the measured channel quality of the signal to the second cell; and transmit information associated with the second channel quality to the first cell wherein the connection with the first cell and the second cell is configured in a time division multiplexing pattern; wherein deriving the second channel quality based on the measured channel quality of the signal comprises storing and averaging the measured channel quality of the signal over a period; and wherein transmitting information associated with the second channel quality to the first cell comprises at least one of: transmitting information associated with the second channel quality to the first cell after switching from the second cell to the first cell, and transmitting information associated with the second channel quality to the first cell when the second channel quality is below or above a configured threshold.

6. The apparatus of claim 5, wherein the first cell is a macro cell or served by a master base station and the second cell is a small cell or served by a secondary base station.

7. The apparatus of claim 5, wherein the information associated with the second channel quality comprises at least one of: channel quality indication associated with the second channel quality, whether the second channel quality is below or above a configured threshold, and relative value of the second channel quality to a channel quality measured from a signal received from the first cell.

8. The apparatus of claim 5, wherein the information associated with the second channel quality is transmitted together with information associated with a measured channel quality of a signal from the first cell or is transmitted with the measured channel quality of the signal from the first cell in a time division multiplexing pattern.

9. A computer program product comprising a non-transitory computer-readable medium bearing computer program code embodied therein for use with a computer, the computer program code comprising code for: establishing connection with a first cell and a second cell; measuring channel quality of a signal received from the second cell; deriving a second channel quality based on the measured channel quality of the signal received from the second cell; transmitting information associated with the measured channel quality of the signal to the second cell; and transmitting information associated with the second channel quality to the first cell, wherein the connection with the first cell and the second cell is configured in a time division multiplexing pattern; wherein deriving the second channel quality based on the measured channel quality of the signal comprises storing and averaging the measured channel quality of the signal over a period; and wherein transmitting information associated with the second channel quality to the first cell comprises at least one of: transmitting information associated with the second channel quality to the first cell after switching from the second cell to the first cell, and transmitting information associated with the second channel quality to the first cell when the second channel quality is below or above a configured threshold.

10. The computer program product of claim 9, wherein the first cell is a macro cell or served by a master base station and the second cell is a small cell or served by a secondary base station.

11. The computer program product of claim 9, wherein the information associated with the second channel quality comprises at least one of: channel quality indication associated with the second channel quality, whether the second channel quality is below or above a configured threshold, and relative value of the second channel quality to a channel quality measured from a signal received from the first cell.

\* \* \* \* \*